Aug. 8, 1950   E. E. FLINT   2,517,779
AIRCRAFT LANDING INSTRUMENT HAVING AN OPTICAL SIGHT
Filed Oct. 3, 1946
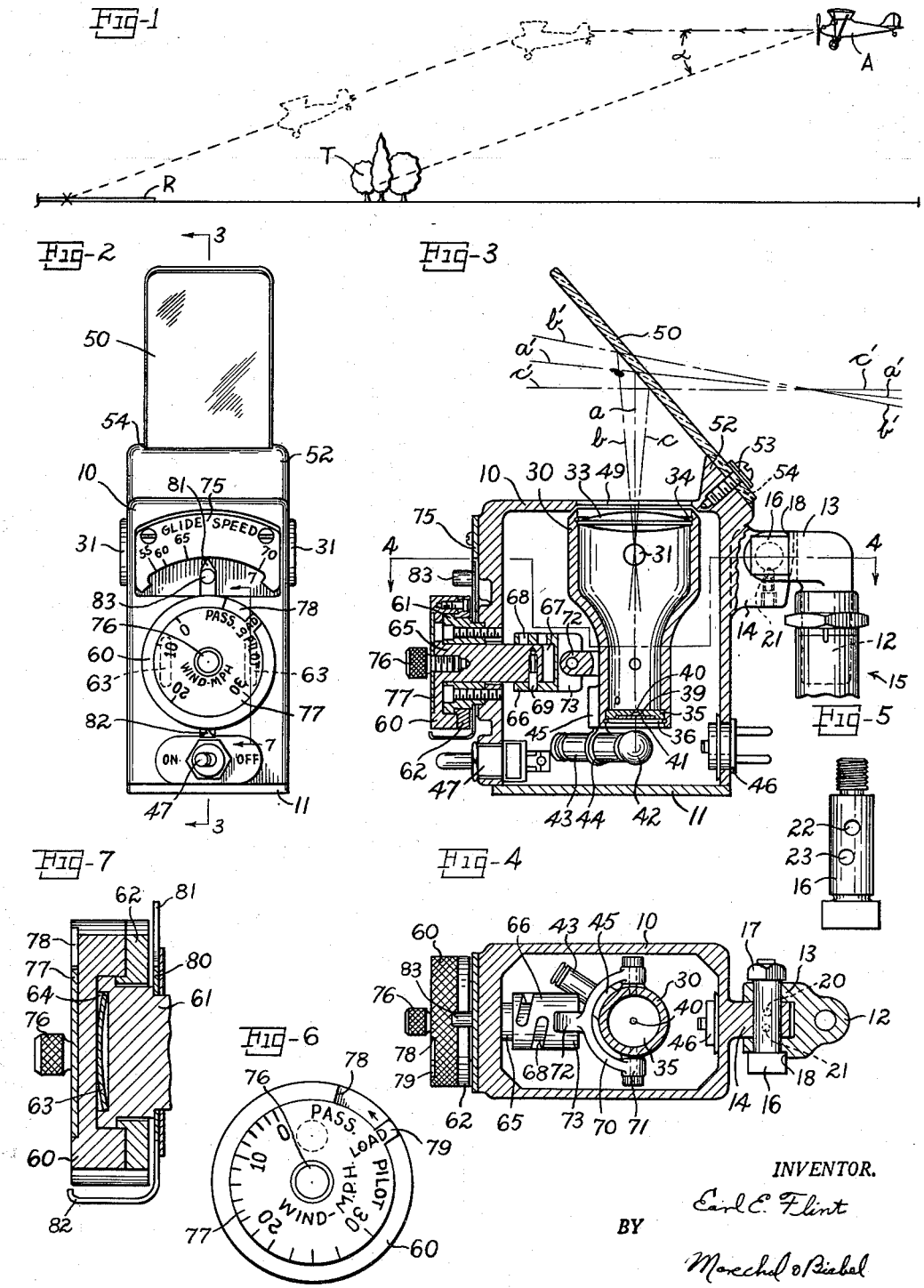
INVENTOR.
Earl E. Flint
BY
Marechal & Biebel
ATTORNEYS Patented Aug. 8, 1950

2,517,779

UNITED STATES PATENT OFFICE 2,517,779

AIRCRAFT LANDING INSTRUMENT HAVING AN OPTICAL SIGHT

Earl E. Flint, Middletown, Ohio

Application October 3, 1946, Serial No. 700,844

13 Claims. (Cl. 88—2.4)

This invention relates to an optical instrument for use in an aircraft for determining the proper landing course thereof.

One of the principal objects of the invention is to provide an optical instrument for use in an aircraft capable of successful use under any weather conditions permitting visibility of the landing area to indicate to the pilot the proper point at which to begin his normal landing procedure in order to land at a predetermined spot.

Another object is to provide such an instrument which utilizes an illuminated optical image superimposed upon the pilot's field of view to indicate to him the deviation of his glide path from a predetermined index direction such as his line of level flight.

An additional object is to provide an instrument of the above character which is readily adjustable by the pilot in flight in accordance with the conditions of wind velocity and speed and weight of the aircraft prevailing at the time of landing.

It is also an object of the invention to provide an instrument as outlined above which is self-illuminated and which may accordingly be successfully utilized at night or under other conditions limiting visibility.

A further object is to provide an optical instrument for use in an aircraft during landing to indicate to the pilot the spatial relation between his glide path and any potential obstacle adjacent the landing area.

A still further object is to provide an instrument as outlined capable of indicating to the pilot of an aircraft the actual course of the aircraft during the landing glide and thereby enabling the pilot to vary his glide in order to land at any desired spot.

Other objects and advantages of the invention will be apparent from the following description, the accompanying drawing and the appended claims.

In the drawing, in which like characters of reference designate like parts throughout—

Fig. 1 is a diagrammatic view illustrating the problems incident to the landing of an airplane to which the present invention relates;

Fig. 2 is a view in elevation of an aircraft landing instrument constructed in accordance with the invention, the view being taken from the side of the instrument facing the pilot in use;

Fig. 3 is a view in vertical section taken substantially on the line 3—3 in Fig. 2;

Fig. 4 is a view in horizontal section taken on the line 4—4 in Fig. 3;

Fig. 5 is an enlarged detail view in elevation illustrating the bolt utilized in the mounting bracket of the instrument shown in Figs. 2–4;

Fig. 6 is an enlarged view of the wind velocity dial utilized in the instrument shown in Figs. 2–4; and Fig. 7 is an enlarged detail view taken in section substantially on the line 7—7 in Fig. 2 and illustrating a spring utilized for holding the adjusting means of the instrument in position.

The present invention is particularly concerned with determining the proper time in preparing to land at which a pilot should begin his normal landing procedure in order to land at a particular spot on the landing field or runway. The course of an aircraft during landing is primarily determined by three variables, which are the weight or loading of the plane, the wind velocity, and the glide speed or "indicated" speed of the plane. These three factors combine to determine the glide angle of the plane, which is the angle formed by its glide path under the prevailing conditions and its line of level flight in the same vertical plane.

The present invention provides an optical instrument for use during the landing of a plane to indicate to the pilot his glide path under the prevailing conditions of wind velocity and the speed and weight of the plane. This instrument provides an optical image which is superimposed upon the pilot's normal field of view at an apparent position determined by calibration and adjustment of the instrument in accordance with the prevailing conditions controlling the path of the plane in landing. By suitable adjustment of the instrument in accordance with these conditions, this image may be caused to appear at an apparent position such that the line of sight thereto will form with the line of level flight, or any other suitable index direction, an angle equal to the angle formed by the glide path of the plane under the prevailing conditions and the index direction. Thus if the plane is caused to fly level and the index direction is the line of level flight, the line of sight to the apparent position of the image in the field will indicate to the pilot his glide path at any instant under the prevailing conditions.

Accordingly, with the instrument of the present invention, when the pilot is approaching a landing area in level flight, he can determine the proper instant at which to begin his normal landing procedure by observing the progress of the apparent position of the image towards the point at which he wishes to land and by beginning his normal landing procedure when the apparent position of the image coincides with the spot at which he wishes to land. Furthermore, in this instrument the optical image is readily provided by an illuminated reticle so that the instrument can be used with equal facility at night or under other conditions of limited visibility, no greater visibility being required for the successful use of the instrument than that sufficient to observe the landing area at the altitude of flight. Also, since the reticle may readily be formed to give any desired and relatively unobtrusive pattern, the use of the instrument will not cause confusion in viewing the actual landing area.

Referring to the drawing, which illustrates a preferred embodiment of the invention, Fig. 1 shows in somewhat diagrammatic fashion an airplane A approaching a landing field bordered by trees T and having a runway R on which the plane is to land. The airplane is indicated as flying level as it approaches the field, and the angle $a$ represents the glide angle under prevailing conditions of wind velocity and the speed and weight of the plane. The point X adjacent the near end of the runway R represents the point or spot on which the pilot wishes to land. The pilot ordinarily must determine as a matter of skill and personal judgment the point in flight at which to begin to glide in order to land at this point X on the runway, but the present invention provides an instrument for indicating this point automatically in accordance with the condition of wind velocity and the speed and weight of the plane existing at the time of landing.

Figs. 2 to 7 show a landing instrument constructed in accordance with the invention for use under the conditions illustrated in Fig. 1 to enable the pilot of the plane reliably and with certainty to land at the point desired. This instrument includes a hollow and generally rectangular casing 10, which may be formed of metal or plastic and has one end open and provided with a cover plate 11 bolted or otherwise secured thereto. These and as many of the other parts of the instrument as possible are preferably made of non-magnetic material to avoid possible interference with the proper operation of the compass of the aircraft wherein the instrument is used.

Figs. 3 and 4 show a bracket arm 12 for mounting the casing in position in an aircraft and attached to the side of the casing normally remote from the pilot in use, which may for convenience be considered as the back of the instrument. As shown, the upper end of bracket arm 12 is forked at 13 to receive a boss 14 integrally formed or otherwise secured to the casing 10, and the other end of the bracket arm 12 may be secured to any suitable supporting portion in the aircraft as indicated generally at 15 in Fig. 3. A bolt 16 and nut 17 provide a pivotal connection between the fork 13 and boss 14, the construction of this bolt being shown in detail in Fig. 5. As shown, bolt 16 has a square head which engages a shoulder 18 on fork 13 and is thereby held against rotation relative to the fork, and the shank portion of the bolt is slightly longer than the outer width of the fork, thereby preventing clamping of the fork on boss 14 by nut 17.

Boss 14 is drilled out to receive two springpressed balls 20 and 21 in line with the axis of bolt 16, and the shank of bolt 16 is countersunk to provide two recesses 22 and 23 to receive these balls. These recesses 22 and 23 are angularly offset around bolt 16 by a predetermined small angle, for example 9°, and one of these recesses is preferably in line with an axial plane of the bolt substantially parallel with a side of its square head. With this construction, only one of balls 20 and 21 can engage in its recess 22 or 23, respectively, at any one time, thus providing a detent which serves to hold the instrument case stationary relative to the bracket arm in either of two positions separated by a predetermined angular distance, the forward position being the position of engagement of ball 20 in recess 22 and the rearward position being that of engagement of ball 21 in recess 22. In flight, the instrument is used in its forward position to determine when to begin the glide and is used in its rearward position while gliding, as will be explained hereinafter.

The image-forming means of this instrument is shown most clearly in Figs. 3 and 4. A hollow tube 30 is mounted for pivotal movement within the casing 10 by means of pivot pins 31 secured to opposite sides of the casing and journaled in opposite sides of tube 30, thus providing for pivotal movement of tube 30 within the casing perpendicular to its central axis. A collimating lens 33 is mounted at the upper end of tube 30 by means such as a snap ring 34, and a reticle plate 35 is similarly mounted by means of a snap ring 36 at the opposite end of tube 30, with its upper surface substantially coinciding with the focal plane of lens 33. For example, a lens 33 of 2½-inch focal length has been found satisfactory, and it will be understood that the other parts shown in the drawing may be in proportion to this dimension.

The reticle plate 35 is preferably opaque except for a small aperture 40 of suitable shape, for example a circular hole 0.040 inch in diameter, and the opposite side of the reticle plate is countersunk at 39 to widen this aperture in order to admit more light thereto. A filter 41 such as a glass disk of orange or other suitable color may be mounted adjacent reticle plate 35, for example in a recess in the surface of this plate as shown in Fig. 3, thus both reducing the intensity of the light passing through aperture 40 and providing it with a distinctive color. A small electric bulb 42, such as a flashlight bulb, is mounted directly below the reticle plate by means of its socket 43 and bracket 44, which may be bolted as shown to a boss 45 formed on the side of tube 30. A socket 46 provides for attachment to an external source of current for bulb 42, such as a battery, and it is shown as mounted in the cover plate 11 of casing 10. A toggle switch 47 is similarly mounted on the front side of casing 10 normally facing the pilot in use and may be connected by suitable wiring, not shown, to control the flow of current from socket 46 to bulb 42.

With the above construction, it will be seen that when bulb 42 is illuminated, light therefrom will pass through the aperture 40 in reticle plate 35 and will be collimated by lens 33 to provide an optical image of the aperture 40 at optical infinity. The invention accordingly provides means for superimposing this image on the field of view of the user of the intrument in such manner that the apparent position of the image in the field may be varied by the pivotal movement of tube 30 as described. Referring particularly to Figs. 3 and 4, the casing 10 is provided with an aperture 49, shown as circular, adapted to register with the upper end of tube 30 to transmit the rays collimated by lens 33, and a transparent reflector plate 50 is secured to the exterior of the case to overlie aperture 49 and thus to superimpose the image carried by these rays on the field of view of the pilot. This transparent mirror 50 is shown as a generally rectangular plate of ground and polished glass, which will usually not require a metal or other reflecting coating. The back upper edge of the casing, above the mounting mechanism, is provided with a beveled boss 52 and the plate 40 is secured to this beveled boss by means such as the bolt and washer 53 threaded into the boss and casing. The beveled surface of boss 52 of the casing is also grooved, as indicated at 54, to provide a retaining slot for the plate 50, the sides of this slot serving to prevent axial displacement of the plate.

The above construction thus provides both for forming an image of the reticle and for superimposing this image on the pilot's field of view through the transparent mirror plate 50. The apparent position of this image in the field will be determined by the angular position of the plate 50 and the angle of incidence thereon of the rays from the reticle, parallax being substantially eliminated by reason of the fact that the reticle image is at optical infinity. The instrument shown in the drawing is designed primarily for use with light aircraft whose minimum glide angle under normal conditions of use is between 5° and 6°, and it has accordingly been found satisfactory to form the beveled surface of boss 52 at an angle of approximately 50° with the top of the casing, as shown in Fig. 3, thus positioning the plate 50 at a similar angle with respect to the casing. With this construction, when tube 30 is in the position indicated in Fig. 3 with its axis perpendicular to the top of casing 10, the image-forming rays will follow the course to plate 50 represented by the broken line $a$, and the apparent position of the image will lie in the direction indicated by the line $a'$, which will form an angle of 10° with the top of the casing, as shown in Fig. 3.

If in the above example tube 30 is tilted rearwardly through 5°, in a counterclockwise direction as viewed in Fig. 3, the image-forming rays will be represented by the line $b$, and the apparent position of the image will be in the direction represented by the line $b'$, which forms an angle of 15° with the top of the casing. Similarly if the tube 30 is tilted forwardly from the vertical through 5°, the course of the image-forming rays will be represented by the line $c$, and the apparent position of the image will be in the direction indicated by the line $c'$ forming an angle of 5° with the top of the casing. In practice, and with the instrument in its forward position relative to bracket arm 12 as determined by the engagement of ball 20 in recess 22, these lines $a'$, $b'$ and $c'$ will indicate the glide path of the aircraft under different conditions of wind velocity, speed and weight, and the invention accordingly provides means for causing this tilting movement and for correlating it with wind velocity and the speed and weight of the aircraft in which the instrument is used at the time of landing so that the line of sight to the resulting apparent position of the image will coincide with the glide path of the aircraft under the prevailing conditions.

Referring to Figs. 2–4, a manual control knob 60 is journaled in a bushing 61 bolted to the front of casing 10, the knob being held on the bushing by means of a collar 62 as shown in Fig. 3. In order to control rotation of knob 60 relative to bushing 61, there may be provided one or more leaf springs 63, as shown in Figs. 2 and 7, each mounted in a suitable slot 64 in the outer face of the bushing and curved outwardly to engage the adjacent part of the knob. The shaft 65 of knob 60, shown as integrally formed therewith, extends into the casing and is connected with a lead screw 66. This lead screw has a cylindrical socket 67 formed in one end thereof which receives the end of shaft 65, and the wall of this socket has a helical groove 68 therein which receives a cam screw 69 set in the side of shaft 65 and projecting therefrom as shown in Fig. 3. At its opposite end, the lead screw 66 is pivotally connected to the lens tube 30, this connection being provided by a yoke 70 pivotally connected to the lens tube at 71 and having a tongue 72 pivotally connected in the forked end 73 of the lead screw.

From the above construction, it will be seen that since knob 60 and shaft 65 can rotate in the casing but are held against axial movement relative to the casing, and since the lead screw 66 is held against rotational movement by its connection to yoke 70, as the knob and shaft rotate, the engagement of cam screw 69 in helical slot 68 will cause the lead screw to move axially with respect to shaft 65, and this will in turn cause tilting movement of the lens tube about its pivotal mounting at 31. This tilting movement of the lens tube will result in changing the angle of incidence of the image-forming rays on the mirror plate 50, as described, thus changing the apparent position of the image of reticle 49 in the field. The invention accordingly also provides index means calibrated in terms of wind velocity and the speed and weight of the aircraft which cooperate to determine the proper setting of knob 60 and tube 30 so that the line of sight to the apparent position of the reticle image will coincide with the glide path of the aircraft under the prevailing conditions.

Referring to Figs. 2–4, a dial 75 is secured to the front of casing 10 and is graduated in terms of glide speeds, shown as varying from 55 to 70 M. P. H. In the use of the device, these speeds are "indicated" speeds, and usually for a particular aircraft there will be a normal glide speed for which the pilot will adjust his various controls, a typical normal glide speed for light airplanes being 60 miles per hour. A second dial 77 is secured to the knob 60 by a thumb screw 76 and calibrated in terms of wind velocity, as shown in detail in Fig. 6, and the connection between this dial 77 and knob 60 is such as to permit limited relative rotation of the dial and knob about a common axis. As shown, this result is obtained by forming the dial of circular shape and mounting it in a counterbored recess in the outer face of the dial with thumb screw 76 coaxial with both the knob and dial, the purpose of this relative rotation being to provide for correction in accordance with the weight of the aircraft as will be explained. The side of the recess in the knob is cut away at 78 to form a slot receiving a finger 79 projecting from dial 77 and thus limiting relative rotation of the knob and dial to the width of slot 78.

An adjustable index member or pointer is also provided to facilitate obtaining the proper registry between the wind velocity dial on the knob 60 and the glide speed dial on the casing. As shown particularly in Fig. 3, an index member 80 is mounted for rotation about the bushing 61 and is provided at opposite ends of a diameter with a pointer 81 adapted to cooperate with the dial 75 and a second pointer 82 adapted to cooperate with the dial 77 on knob 60. A pin 83 projects from pointer 81 to provide a handle for ready manipulation. Thus when the pointer 81 is moved to register with different glide speeds, this will produce corresponding movement of the pointer 82 and thus provide for a different adjustment of knob 60 in accordance with the glide speed adjustment. As shown, clockwise rotation of knob 60 will cause the tube 20 to tilt rearwardly and thus increase the angle between the horizontal and the line of sight to the apparent position of the reticle image in the field, and since the glide angle will increase with wind velocity, the dial 77 is calibrated counterclockwise from the zero position as shown in Fig. 6. Also, since the glide angle will similarly increase as the glide speed increases, dial 75 is similarly calibrated in clockwise arrangement as shown in Fig. 2.

It will also be seen that under given conditions of wind velocity and speed, the glide angle will increase with increase in the weight of the aircraft, and the invention provides means for correcting the reading of the instrument in accordance with such weight conditions. In the illustrated device, which is designed primarily for use in light planes, such provision is made for compensating for differences in weight as between the aircraft carrying only its pilot and carrying also a passenger. As noted, the dial 77 is provided with a finger 79 which lies in the slot 78 in the face of knob 60, so that when the thumb screw 76 is loosened, dial 77 may be rotated through an angle determined by the length of slot 78. The shift of this dial from its indicated position for the weight without the passenger to the position for weight with the passenger will be a counterclockwise movement with respect to the knob 60, and this in turn will result in further clockwise movement of the knob with respect to the casing for the same glide speed and wind velocity. It will be apparent that in devices of this kind designed for use on large planes wherein the weight variations may be over a wide range, provision may readily be made for such adjustment to compensate for a plurality of different weights, as well as for wider ranges of wind velocity and glide speeds.

The initial calibration of this instrument, in the formation of its parts and particularly the dials 75 and 77, should take into account the gliding characteristics of a given aircraft or type of aircraft. For example, this initial calibration may be determined by first plotting the actual glide paths of a reference airplane over the desired range of glide speeds and under the various wind velocity conditions likely to be met in practice, and these glide paths should also take into account the different weight conditions under which the plane will normally be used. Final checking of the instrument is facilitated by also preparing a sighting board based on the plotted glide paths and indicating at a given distance, for example 500 inches, the angular deviation of the glide paths for the different speed, weight and wind velocity conditions from a predetermined index direction, which may conveniently be the line of level flight.

In the final checking and installation of the instrument, this sighting board may be set up at the proper distance on the ground from the plane and the latter jacked into proper flying position for the predetermined index direction. The instrument is then mounted in the plane in its forward position relative to bracket arm 12, but not finally tightened in position, and is turned on, set for a particular glide angle and adjusted in the plane until the reticle image coincides with the corresponding index mark on the sighting board. In this position the mount for bracket arm 12 is finally tightened, and the instrument is ready for use.

In operation, any necessary adjustment of the instrument in accordance with the weight of the plane will be made prior to approaching the landing area, by loosening thumb screw 76 and moving dial 77 relative to the control knob. Then as the plane approaches the landing field, the pilot adjusts its flying attitude in accordance with the proper index direction, which is shown as the line of level flight in Fig. 1, and sets the pointer 81 opposite the glide speed at which he intends to land. He then adjusts the knob 60 with respect to the pointer 82 in accordance with wind velocity, as determined by observation or information from the field, turns on the instrument and observes the apparent position of the reticle image in the field. Thus referring to Fig. 1, when the plane is in the position shown in full lines, the reticle image will appear to coincide with the trees T. This means that if at that instant the pilot should begin his glide, he would follow the indicated path from A to T and would strike the trees, and he will thus know he is still too far from the field. Accordingly he continues level flight until the reticle image reaches the position X on the runway at which he wishes to land. When this happens, he immediately cuts his engine to the desired glide speed and begins his approach glide, and since with the instrument properly calibrated this glide path will coincide with the line of sight to the apparent position of the image just prior to beginning the glide, the plane will land at the desired point.

After the pilot begins his glide, he does not again refer to the instrument unless he wishes to check the relation of his glide path to potential obstacles near the landing area. The use of the instrument in such cases is also illustrated in Fig. 1. For example, if after the pilot begins his glide, he is in doubt as to whether or not the plane will clear the trees T, he need only shift the instrument on bracket arm 12 into its rearward position provided by detent 21—23, thus raising the line of sight to the apparent position of the reticle image, and adjust knob 60 until the image falls on the trees and then watch its further movement. If it gradually passes in the direction of flight along the ground and beyond the trees, the pilot knows he will clear them and land safely. However, if the image remains superimposed on the trees as the plane glides down, this will show that the line of sight to the image is substantially coincident with the actual glide path of the plane and that it will strike the trees unless the pilot decreases his angle of glide. Similarly, if the image gradually moves oppositely to the direction of flight and falls short of the trees, this will show that the line of sight to the image is displaced angularly above the actual glide path and will mean that the plane will land in front of the trees, and the pilot will be advised accordingly. The shift of the instrument to its rearward position is required to give sufficient angular range, since in the compact structure illustrated, the lens tube cannot tilt forward sufficiently to raise the line of sight to the apparent position of the image to coincide with the line of actual flight.

As has been pointed out, the actual glide path of an airplane in landing is determined primarily by three variable factors, namely, the glide speed and weight of the airplane and the prevailing wind velocity, and it will accordingly be seen that the present invention provides an instrument which takes into consideration all three of these factors and automatically calculates from them the actual glide angle of the plane under the prevailing conditions. Also, the instrument shows to the pilot at each instant what his glide path would be if he should begin his glide at that instant, and it does so by projecting an image on his field of view at an apparent position such that the line of sight thereto during level flight will form with the line of level flight an angle equal to the actual glide angle under these prevailing conditions. This enables the pilot to determine the exact instant in approaching the landing field at which to begin his landing procedure in order to land at any particularly desired point. The instrument is accordingly well adapted to use in the training of student pilots.

The instrument is self-illuminated and self-contained, and it may therefore be used successfully under widely varying conditions of visibility and even under severely limited visibility conditions. For example, the device will function satisfactorily and may be used successfully at night when the landing area is obscured except for sufficient guide lighting to indicate the beginning and direction of the landing runway. In addition, the instrument of the invention is quickly and readily adjustable by the pilot immediately prior to landing in order to take into consideration the wind velocity and weight conditions existing at that particular time, such adjustment merely requiring simple movement of the pointer 81 and the control knob 60, and once adjusted, the instrument cannot readily shift out of adjustment. Furthermore, use of the instrument does not interfere with the normal binocular vision of the pilot nor does it require correction for parallax or other interpretation of what the pilot actually sees.

As has also been pointed out, the instrument of the invention has further use while the plane is actually gliding to indicate quickly and accurately to the pilot whether his glide path will in fact clear any potential obstacles near the landing area or whether he should make any immediate correction to avoid such obstacles. Furthermore, the instrument enables the pilot to choose his landing spot with great accuracy, since with the casing in its rearward position, he can adjust the knob until his line of sight to the image position coincides with his glide path and then guide the plane to any desired spot by simply manipulating his controls until the reticle image falls directly on such spot. This feature of the instrument is particularly useful when landing with a dead motor and in other emergency landings, where the choice of the actual landing point may be of vital importance, as well as in pilot training.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A device of the character described for use in determining the proper landing course of an aircraft and comprising, in combination, a frame, means for mounting said frame in position in an aircraft in predetermined angular relation with a predetermined index direction, means including a reticle carried by said frame for forming an illuminated optical image at optical infinity, means carried by said frame for superimposing said image on the field of view of the pilot of said aircraft, means for adjusting the operative relationship of said image-forming means and said superimposing means to vary the apparent position of said image in said field of view, index means calibrated in terms of wind velocity and the speed and weight of said aircraft, and means coordinating said index means with said adjusting means to determine the proper setting of said adjusting means wherein said apparent position of said image is such that the line of sight thereto will form with said index direction an angle equal to the angle formed by said index direction and the glide path of said aircraft under conditions of wind velocity and the speed and weight of said aircraft corresponding to the relative setting of said index means and said adjusting means.

2. A device of the character described for use in determining the proper landing course of an aircraft and comprising, in combination, a frame, means for mounting said frame in position in an aircraft in predetermined angular relation with a predetermined index direction, means carried by said frame for forming an illuminated optical image at optical infinity, means carried by said frame for superimposing said image on the field of view of the pilot of said aircraft, means including a member movable relative to said frame for adjusting the operative relationship of said image-forming means and said superimposing means to vary the apparent position of said image in said field of view, a plurality of index means cooperating with said adjusting means, one of said index means being fixed with relation to said frame and the other being fixed with relation to said adjusting member, one of said index means being calibrated in terms of wind velocity and the other in terms of the speed of said aircraft, and means establishing cooperation between said index means during adjusting movement of said adjusting member to determine the proper setting thereof wherein the apparent position of said image in said field of view is such that the line of sight thereto will form with said index direction an angle equal to the angle formed by said index direction and the glide path of said aircraft under prevailing conditions of wind velocity and the speed of said aircraft.

3. A device of the character described for use in determining the proper landing course of an aircraft and comprising, in combination, a frame, means for mounting said frame in position in an aircraft in predetermined angular relation with a predetermined index direction, means carried by said frame for forming an illuminated optical image at optical infinity, means carried by said frame for superimposing said image on the field of view of the pilot of said aircraft, means including a member movable relative to said frame for adjusting the operative relationship of said image-forming means and said superimposing means to vary the apparent position of said image in said field of view, index means fixed with relation to said frame, other index means carried by said adjusting member and adapted to cooperate with said fixed index means, one of said index means being calibrated in terms of wind velocity and the other in terms of the speed of the aircraft, said index means cooperating during adjusting movement of said adjusting member to determine the proper setting thereof wherein the apparent position of said image in said field of view is such that the line of sight thereto will form with said index direction an angle equal to the angle formed by said direction and the glide path of said aircraft under prevailing conditions of wind velocity and the speed of said aircraft, and means for effecting adjustment of the cooperative relationship of said index means in accordance with the weight of said aircraft.

4. A device of the character described for use in determining the proper landing course of an aircraft and comprising, in combination, a frame, means for mounting said frame in position in an aircraft in predetermined angular relation with a predetermined index direction, means carried by said frame for forming an illuminated optical image at optical infinity, means carried by said frame for superimposing said image on the field of view of the pilot of said aircraft, a member mounted for rotation relative to said frame for adjusting the apparent position of said image in said field of view, index means carried by said frame, an index member mounted for rotation relative to said frame and said rotatable member and adapted to provide an index position in accordance with the setting thereof relative to said index means, other index means carried by said adjusting member and adapted to register with said index member, one of said index means being calibrated in terms of wind velocity and the other in terms of the speed of said aircraft, said index means carried by said adjusting member also being adjustable with respect to said adjusting member and about the axis thereof in accordance with the weight of said aircraft, said last named index means cooperating with said index member to determine the proper setting of said adjusting member to fix an apparent position of said image in said field of view such that the line of sight thereto will form with said index direction an angle equal to the angle formed by said index direction and the glide path of said aircraft under predetermined conditions of wind velocity and the speed and weight of said aircraft.

5. A device of the character described, for use in determining the proper landing course of an aircraft and comprising, in combination, a frame, means for forming an optical image at optical infinity, said image-forming means having an optic axis, means supporting said image-forming means in said frame on a pivotal axis perpendicular to said optic axis thereof, a transparent mirror carried by said frame for superimposing said image on the field of view, means for adjusting said image-forming means about said pivotal axis to vary the angle between said optic axis thereof and said transparent mirror and thereby to vary the apparent position of said image on the field of view, a control member for said adjusting means mounted on the side of said frame normally adjacent the pilot of an aircraft when said device is mounted for use therein, index means carried by said frame and cooperating index means carried by said rotatable member, one of said index means being calibrated in terms of wind velocity and the other in terms of the speed of said aircraft, and means establishing cooperation between said index means during movement of said control member when said device is mounted in an aircraft to determine the proper angular setting of said optic axis of said image-forming means and said transparent mirror to cause the line of sight to said apparent position of said image to coincide with the guide path of said aircraft under conditions of wind velocity and speed of said aircraft corresponding to the setting of said index means.

6. A device of the character described for use in determining the proper landing course of an aircraft and comprising, in combination, a frame, means for forming an optical image at optical infinity, said image-forming means having an optic axis, a transparent mirror carried by said frame for superimposing said image on the field of view, means supporting said image-forming means in said frame on a pivotal axis perpendicular to said optic axis thereof to vary the angle between said optic axis and said transparent mirror and thereby to vary the apparent position of said image on said field of view, a control member for adjusting said image-forming means on said pivotal axis, said control member mounted for rotation on the side of said frame normally adjacent the pilot of an aircraft when said device is mounted for use therein, means connecting said control member with said image-forming means and including a pair of members having relative telescoping threaded engagement and providing for pivotal movement of said image-forming means in one direction in response to clockwise rotation of said control member and in the opposite direction in response to counter-clockwise rotation of said control member, and index means associated with said control member and calibrated in terms of wind velocity and the speed of an aircraft, and means establishing cooperation between said index means and said control member to determine the proper angular setting of said optic axis of said image-forming means and said transparent mirror to cause the line of sight to said apparent position of said image to coincide with the glide path of said aircraft under predetermined conditions of wind velocity and the speed of said aircraft.

7. A device of the character described for use in determining the proper landing course of an aircraft and comprising, in combination, a frame, means for forming an optical image at optical infinity, means carried by said frame for superimposing said image on the field of view, means supporting said image-forming means in said frame for pivotal movement perpendicular to the optic axis thereof to vary the apparent position of said image in said field, a control member for said image-forming means mounted for rotation on the side of said frame normally adjacent the pilot of an aircraft when said device is mounted for use therein, means connecting said control member with said image-forming means and providing for pivotal movement thereof in one direction in response to clockwise rotation of said control member and in the opposite direction in response to counterclockwise rotation of said control member, index means carried by said frame and calibrated in terms of glide speed, an index member mounted for rotation relative to said frame and said rotatable member and adapted to provide an index position in accordance with the setting thereof relative to said index means, other index means carried by said control member and adapted to register with said index member, said second named index means being calibrated in terms of wind velocity and being adjustable with respect to said control member in accordance with the weight of an aircraft, said second named index means cooperating with said index member to determine the proper setting of said control member to cause the line of sight to the apparent position of said image to coincide with the glide path of said aircraft under predetermined conditions of wind velocity and the speed and weight of said aircraft.

8. A device of the character described for use in determining the proper landing course of an aircraft and comprising, in combination, a frame, means for mounting said frame in position in an aircraft in predetermined angular relation with a predetermined index direction, means including a reticle carried by said frame for forming an illuminated optical image at optical infinity, means carried by said frame for superimposing said image on the field of view of the pilot of said aircraft, means for adjusting the apparent position of said image in said field of view, and index means cooperating with said adjusting means to control said apparent position of said image such that the line of sight thereto will form with said index direction an angle equal to the angle formed by said index direction and the glide path of said aircraft under predetermined conditions of wind velocity and the speed and weight of said aircraft, said mounting means including means providing for tilting movement of said frame about a horizontal axis substantially perpendicular to the line of flight of said aircraft and detent means controlling said tilting movement of said frame.

9. A device of the character described for use in determining the proper landing course of an aircraft and comprising, in combination, a frame, means for mounting said frame in position in an aircraft in predetermined angular relation with a predetermined index direction, means carried by said frame for forming an illuminated optical image at optical infinity, said image-forming means having an optic axis, means for superimposing said image on the field of view of the pilot of said aircraft, means for adjusting the angular relation between said superimposing means and the said optic axis of said image-forming means to vary the apparent position of said image in said field of view, index means calibrated in terms of wind velocity and the speed of said aircraft cooperating with said adjusting means to control said apparent position of said image such that the line of sight thereto will form with said index direction an angle equal to the angle formed by said index direction and the glide path of said aircraft under predetermined conditions of wind velocity and the speed of said aircraft, said mounting means including a horizontal pivot substantially perpendicular to the line of flight of said aircraft for effecting tilting of said frame to raise the line of sight to said apparent image position to substantial coincidence with the said line of flight, and means for controlling said tilting movement of said frame and including a plurality of detents in said mounting means arranged in predetermined spaced angular relation with respect to each other about said tilting axis.

10. A device of the character described for use determining the proper landing course of an aircraft and comprising, in combination, a frame, means for mounting said frame in position in an aircraft and including a shaft providing for tilting movement of said frame about a horizontal axis substantially perpendicular to the line of flight of said aircraft, a plurality of relatively movable detent members carried by said shaft and frame, said detent members being angularly arranged with respect to each other relative to the axis of said shaft and controlling tilting movement of said frame to two positions relative to a predetermined index direction and having a predetermined angular difference, means carried by said frame for forming an optical image at optical infinity and for superimposing said image on the field of view of the pilot of said aircraft, means carried by said frame for adjusting the apparent position of said image in said field of view, and index means cooperating with said adjusting means to control said apparent position of said image such that with said frame in one of its said positions the line of sight to said image position will form with said index direction an angle equal to the angle formed by said index direction and the glide path of said aircraft under predetermined conditions of wind velocity and the speed of said aircraft, the angular difference between said detent members being such that when said frame is tilted to its other said position said line of sight can be caused to coincide with the line of flight of said aircraft.

11. A device of the character described for use in determining the proper landing course of an aircraft, comprising a frame, means having an optic axis for forming an optical image at optical infinity, means supporting said image-forming means in said frame on a pivotal axis substantially perpendicular to said optic axis, a transparent mirror carried by said frame for superimposing said image on the field of view, means for adjusting said image-forming means about said pivotal axis to vary the angle between said optic axis and said mirror and thereby to vary the apparent position of said image on the field of view, relatively movable index means associated with said adjusting means and calibrated in terms of wind velocity and the speed of an aircraft, means for mounting said device in an aircraft, and means cooperating with said mounting means to coordinate said index means and said adjusting means for determining the proper angular setting of said optic axis with respect to said mirror wherein the line of sight to the apparent position of said image coincides with the glide path of said aircraft under predetermined conditions of wind velocity and the speed of said aircraft.

12. A device of the character described for use in determining the proper landing course of an aircraft, comprising a frame, means having an optic axis for forming an optical image at optical infinity, means supporting said image-forming means in said frame on a pivotal axis substantially perpendicular to said optic axis, a transparent mirror carried by said frame for superimposing said image on the field of view, means for adjusting said image-forming means about said pivotal axis to vary the angle between said optic axis and said mirror and thereby to vary the apparent position of said image on the field of view, a control member for said adjusting means mounted for movement relative to said frame, index means carried by said frame, cooperating index means carried by said control member, one of said index means being calibrated in terms of wind velocity and the other in terms of the speed of an aircraft, means for mounting said device in an aircraft, and means cooperating with said mounting means to coordinate said index means during movement of said control member to determine the proper angular setting of said optic axis and said mirror wherein the line of sight to said apparent position of said image coincides with the glide path of said aircraft under conditions of wind velocity and the speed of said aircraft corresponding to the setting of said index means.

13. A device of the character described for use in determining the proper landing course of an aircraft, comprising a frame, means having an optic axis for forming an optical image at optical infinity, means supporting said image-forming means in said frame on a pivotal axis substantially perpendicular to said optic axis, a transparent mirror carried by said frame for superimposing said image on the field of view, means for adjusting said image-forming means about said pivotal axis to vary the angle between said optic axis and said mirror and thereby to vary the apparent position of said image on the field of view, a control member for said adjusting means mounted for movement relative to said frame, index means carried by said frame, cooperating index means carried by said control member, one of said index means being calibrated in terms of wind velocity and the other in terms of the speed of an aircraft, said cooperating index means also being adjustable with respect to said control member for correcting the relative reading of said index means in accordance with the weight of the aircraft, means for mounting said device in an aircraft, and means cooperating with said mounting means to coordinate said index means during movement of said control member to determine the proper angular setting of said optic axis and said mirror wherein the line of sight to said apparent position of said image coincides with the glide path of said aircraft under conditions of wind velocity and the speed of said aircraft corresponding to the setting of said index means.

EARL E. FLINT.

REFERENCES CITED

The following references are of record in the file of this patent:

UNITED STATES PATENTS

| Number | Name | Date |
|---|---|---|
| 1,664,409 | Gardner | Apr. 3, 1928 |
| 1,963,826 | Chilton | June 19, 1934 |
| 2,031,601 | Hegenberger et al. | Feb. 25, 1936 |
| 2,280,126 | Metcalf | Apr. 21, 1942 |
| 2,336,809 | Slavens | Dec. 14, 1943 |
| 2,367,207 | Flint | June 16, 1945 |
| 2,384,036 | Klemperer | Sept. 4, 1945 |
| 2,412,585 | Klemperer | Dec. 17, 1946 |
| 2,424,088 | Furman et al. | July 15, 1947 |

FOREIGN PATENTS

| Number | Country | Date |
|---|---|---|
| 29,669 | Great Britain | Dec. 24, 1912 |